United States Patent [19]

Finarov

[11] Patent Number: 5,604,344
[45] Date of Patent: Feb. 18, 1997

[54] AUTOFOCUSSING MICROSCOPE HAVING A PATTERN IMAGING SYSTEM

[75] Inventor: Moshe Finarov, Rehovot, Israel

[73] Assignee: Nova Measuring Instruments Ltd., Israel

[21] Appl. No.: 539,030

[22] Filed: Oct. 4, 1995

[30] Foreign Application Priority Data

Oct. 10, 1994 [IL] Israel ......................................... 111229

[51] Int. Cl.⁶ ......................................................... G01J 1/20
[52] U.S. Cl. ..................................... 250/201.3; 250/201.7; 396/89
[58] Field of Search ............................ 250/201.3, 201.4, 250/201.7, 201.8, 201.2, 204; 355/53–55, 33, 66, 22, 46; 356/4.04, 125, 4.05; 354/402–408

[56] References Cited

U.S. PATENT DOCUMENTS

| | | | |
|---|---|---|---|
| 4,577,095 | 3/1986 | Watanabe | 250/204 |
| 4,639,587 | 1/1987 | Chadwick et al. | 250/204 |
| 4,725,722 | 2/1988 | Maeda et al. | 356/4 |
| 4,945,220 | 7/1990 | Mallory et al. | 250/201.7 |
| 5,136,149 | 8/1992 | Fujiwara et al. | 250/201.5 |
| 5,306,902 | 4/1994 | Goodman | 250/201.3 |

*Primary Examiner*—Que T. Le
*Attorney, Agent, or Firm*—Sjerven, Morrill, MacPherson, Franklin & Friel, LLP; Forrest E. Gunnison

[57] ABSTRACT

An autofocussing mechanism is provided which is useful for all objective lenses and during scanning of the object. The autofocussing mechanism operates with a microscope having a main optical path, an objective lens, an object surface, an image plane and apparatus for changing the distance between the objective lens and the object surface thereby to focus the image of the object. The autofocussing mechanism preferably includes a pattern imaging system, a single image detector and a pattern focus analyzer. The pattern imaging system images at least one pattern through the objective lens along the main optical path and onto the object surface. The image of the pattern is then combined with an image of the object and is reflected along the main optical path towards the image plane. The image detector detects the reflected image and the pattern focus analyzer determines the extent of sharpness of the pattern by analyzing the output of the image detector. The pattern focus analyzer can also indicate, to the apparatus for changing the distance, to move in a direction of increased focus.

18 Claims, 6 Drawing Sheets

AUTOFOCUSSING MICROSCOPE HAVING A PATTERN IMAGING SYSTEM

FIELD OF THE INVENTION

The present invention relates to autofocussing mechanisms generally and to autofocussing mechanisms for low numerical aperture optical systems in particular.

BACKGROUND OF THE INVENTION

Autofocussing systems for optical systems, such as microscopes, are known in the art. There are a number of different types, all of which include an autofocussing sensing unit and an autofocussing driver. The sensing unit provides a focus error signal which is proportional to the extent of defocus of the image (i.e. proportional to the distance between the nominal object plane and the actual plane of the object). The driver, which is typically a motor of some kind, translates either the object or the focal plane.

Autofocussing systems can be divided into two main groups, static and dynamic systems, based on the state of the object currently out of focus.

Static autofocus systems utilize the object, which remains stationary, to determine the extent of defocus. For example, the autofocus systems of most consumer cameras analyze the sharpness of the details of the object in a received image to determine the extent of defocus. As the optical system is moved toward and away from the object, the change in the defocus is measured.

A typical prior art microscope is illustrated in FIG. 1 to which reference is now made. The microscope includes, along an optical path 8, a translatable objective lens 10, a stationary tube lens 12, an image plane 14 which is the focal plane of the tube lens 12 and an object surface or plane 16 on which an object to be viewed, such as a film, is placed. The microscope additionally includes a light source 18 for illuminating the object and a beam splitter 20 for directing the light beam 22, produced by the light source 18, towards the object surface 16. The object on the object surface 16 reflects the light back through the objective lens 10, beam splitter 20 and tube lens 12 towards the image plane 14.

If the object surface 16 is not at the focal plane of lens 10, the translatable objective lens 10, the focus is adjusted by moving the lens 10 in the direction of the optical path 8. Alternatively, the object surface 16 is moved. The depth of field (DOF) of the objective lens 10 is limited, as illustrated in FIG. 1.

Microscopes typically have triangulating autofocussing sensing units which utilize oblique illumination and specular reflection. Thus, as shown in FIG. 2 to which reference is now made, an autofocussing light source 19 is placed so as to obliquely illuminate the object plane 16 and the microscope additionally includes a position sensing detector (PSD) 28 for sensing the lateral displacement of the beam (as will be described hereinbelow) and a motor 27 for moving objective lens 10.

In the microscope of FIG. 2, the light beam, labeled 30, is deflected by the beam splitter 20 at a point A to one side of the optical path 8. The deflected beam 30 is bent by the objective lens 10 so as to obliquely illuminate, at an angle a, the object plane 16 at a reflection point C.

Beam 30 is reflected as light beam 32 and is deflected by beam splitter 20 at a point B, on the other side of the optical path 8 from the point A. The deflected light beam 32 then illuminates the PSD 28 which measures the location at which beam 32 fell upon it.

If the object surface 16 is out of focus because it is far from the objective lens 10, for example, at the location labeled 16' and indicated by dashed lines, the light beam 30 will travel further before being reflected, to a reflection point D which is laterally shifted from the point C, the previous reflection point.

Since the distance between the reflection points C and D are a function of the extent of the defocus and since that distance is reflected in the distance between points B and B', the extent of the defocus can be measured and, accordingly, compensated by having motor 27 move objective lens 10.

The following U.S. patents provide descriptions of various systems operating on the above-described triangulation principle: U.S. Pat. No. 5,136,149 to Fujiwara et al. and U.S. Pat. No. 4,577,095 to Watanabe.

Dynamic autofocussing is utilized when it is desired to keep the object permanently in focus while moving relative to the objective lens. These methods are common in automatic optical inspection systems, such as for silicon wafer or reticle inspection systems, which must inspect a large object surface within a short period of time.

In automatic inspection systems, the object is continually being scanned (movement in the plane of the object surface noted by arrow 29) and the object typically has a two-dimensional pattern on it. As a result, the stationary autofocussing methods do not work since the movement of the object, and its pattern, affects the sensing of the focus. U.S. Pat. No. 4,639,587 to Chadwick et al. describes a system which bypasses the effects of a moving object. In their system, a grid which is in an illumination path is projected, through the objective lens of the microscope, onto an inspected article. The grid is alternately projected onto the article with two different offsets from the main optical axis of the microscope. As a result, the grid is projected obliquely onto the inspected article.

Each reflected beam is projected onto a static grid which is adjusted to the nominal grid image when the image is in focus by one quarter of the grid period. The light intensity of the reflected grids through the static grids is measured.

The displacement of the article to be inspected is determined as a function of the extent of displacement of the reflected grids with respect to the static ones. Since both optical paths provide the same grid displacement, but in opposite directions, the difference between their signals measures the focus error and, the focus error is insensitive to the pattern of the inspected article.

Since the error signal of U.S. Pat. No. 4,639,587 is produced by analog detectors, their system is very sensitive to background level of stray light, noise, and a lack of uniformity of the two optical paths. As a result, their system includes additional optical and electronic elements to provide the necessary self-compensation and self-calibration.

It is further noted that the triangulation methods require a fairly large angle of oblique illumination. Otherwise, the lateral shift of the beam will not be a sensitive enough measure of the extent of defocus. Therefore, triangulation methods do not work well for objective lenses with low numerical apertures which induce small angles of incidence of sensing beams.

U.S. Pat. No. 4,725,722 to Maeda et al. describes a method of autofocusing suitable for integrated circuits. The method projects a striped pattern onto the object to be focussed and the contrast of the image of the strip pattern is used for focusing. The image is imaged by an optical system and detected by two detectors, each in two different locations vis-a-vis the focal plane of the optical system. When the signals of the two detectors are equally out of focus, the object is at the focal plane of the optical system.

SUMMARY OF THE PRESENT INVENTION

It is an object of the present invention to provide an autofocussing mechanism which is useful for all objective lenses but particularly for those with low numerical apertures.

Furthermore, it is an object of the present invention to provide an autofocussing mechanism which is useful during scanning of the object.

The autofocussing mechanism operates with a microscope having a main optical path, an objective lens, an object surface, an image plane and apparatus for changing the distance between the objective lens and the object surface thereby to focus the image of the object. The autofocussing mechanism preferably includes a pattern imaging system, a single image detector and a pattern focus analyzer. The pattern imaging system images at least one pattern through the objective lens along the main optical path and onto the object surface. The image of the pattern is then combined with an image of the object and is reflected along the main optical path towards the image plane. The image detector detects the reflected image and the pattern focus analyzer determines the extent of sharpness of the pattern by analyzing the output of the image detector. The pattern focus analyzer can also indicate, to the apparatus for changing the distance, to move in a direction of increased focus.

In accordance with a preferred embodiment of the present invention, the pattern imaging system includes high contrast pattern apparatus, an additional lens, an autofocus light source and a beam splitter. The additional lens images the pattern through the objective lens onto the object plane. The autofocus light source illuminates the pattern towards the additional lens and the beam splitter combines the pattern imaging system with the main optical path.

Additionally, in accordance with one preferred embodiment of the present invention, the high contrast pattern apparatus includes a single pattern located at the object plane of the additional lens. Alternatively, it includes two high contrast patterns located equidistant from the object plane of the additional lens. In the alternative case, each of the high contrast patterns is imaged on a different part of the object plane of the objective.

Moreover, in accordance with preferred embodiments of the present invention, the autofocussing mechanism is combined along an illumination path of the microscope. Alternatively, it can be combined along the main optical path.

Furthermore, in accordance with one preferred embodiment of the present invention, the autofocus light source provides light which is not visible to the human eye.

Finally, in accordance with a preferred embodiment of the present invention, the pattern focus analyzer includes a pattern extractor for extracting the pattern and a pattern sharpness determiner for determining the sharpness of the pattern. In the two pattern case, the pattern sharpness determiner operates separately on images from each of the two high contrast patterns thereby generating two sharpness values. From the sharpness values, the pattern analyzer determines a direction and amount of movement for the apparatus for changing the distance between the objective and the object surface.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
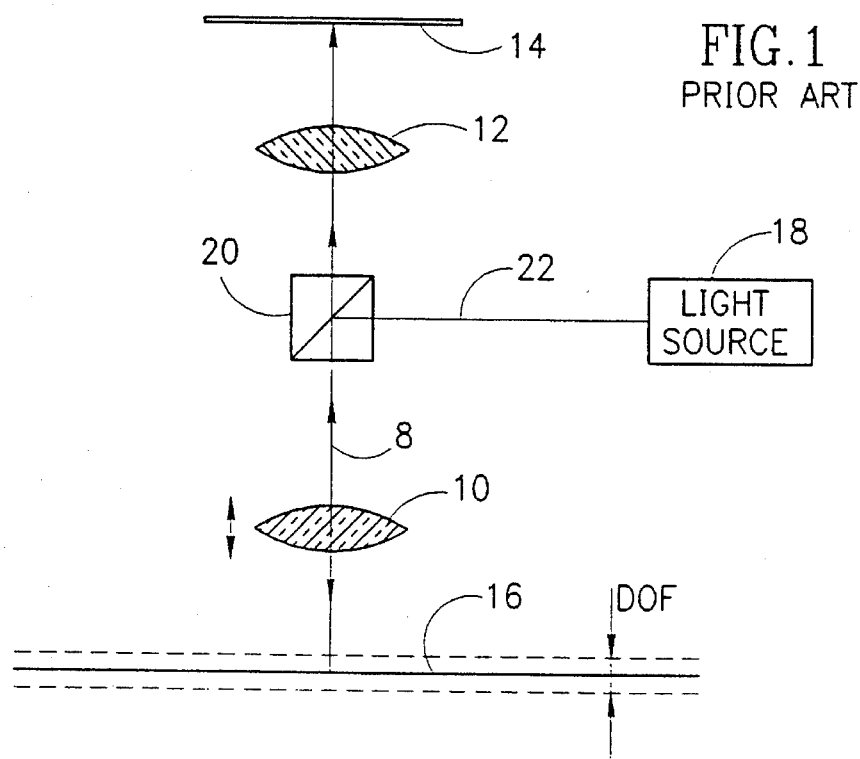
FIG. 1 is a prior art schematic illustration of a microscope.
Figure 3:
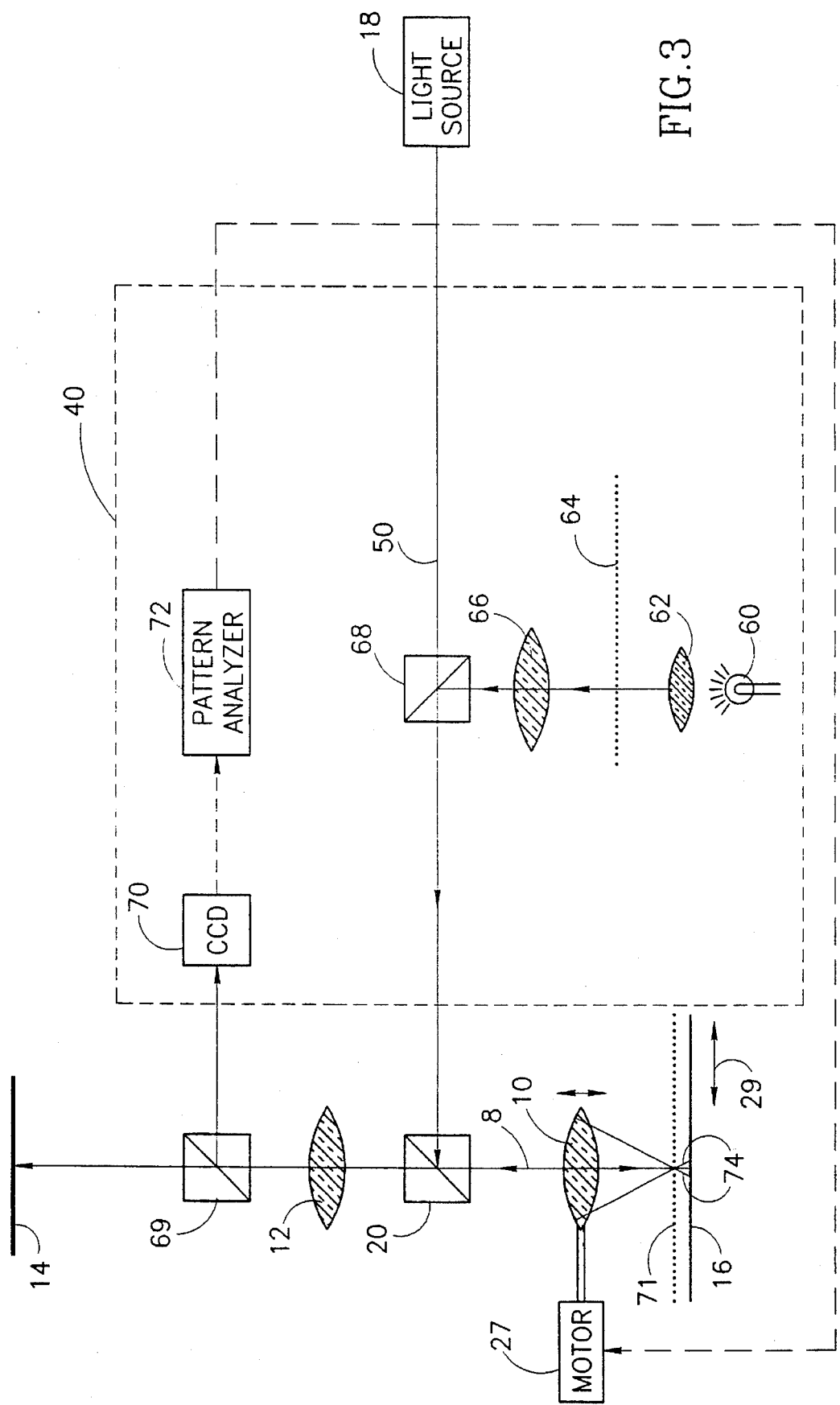
FIG. 3 is a schematic illustration of a microscope with an autofocussing mechanism constructed and operative in accordance with a first preferred embodiment of the present invention.

Reference is now made to FIG. 3 which illustrates a prior art microscope, such as that shown in FIG. 1, with an accessory autofocussing apparatus 40 constructed and operative in accordance with a first preferred embodiment of the present invention.

Figure 2:
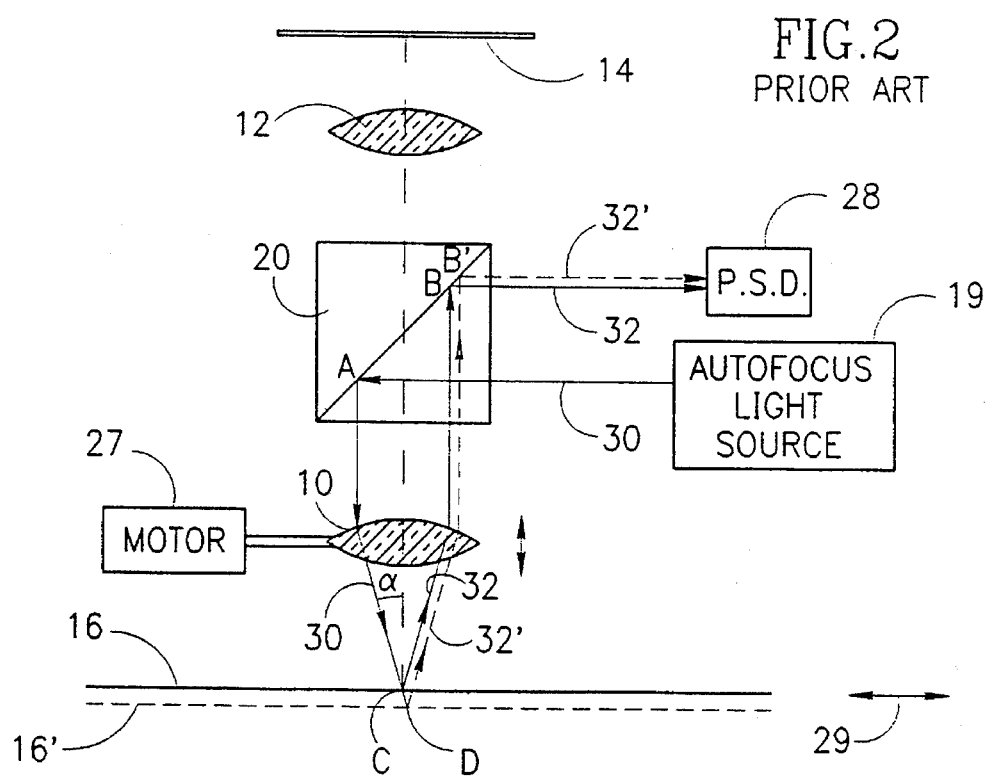
FIG. 2 is a prior art schematic illustration of a microscope with a triangulating autofocus mechanism.

As in FIG. 1, the microscope of FIG. 3 comprises an object surface 16, an objective lens 10, a beam splitter 20, a tube lens 12, an image plane 14 and an illuminating light source 18. As in the prior art, the objective lens 10, the beam splitter 20 and the tube lens 12 are on the main optical path 8 and the light source 18 provides a light beam 50 which, through the beam splitter 20, is deflected onto the optical path 8. As shown in FIG. 2, the objective lens 10 is movable via an associated motor 27.

In accordance with the first embodiment of the present invention, the autofocussing apparatus 40 is an accessory which can be added into the optical system of any prior art microscope. Apparatus 40 comprises a secondary light source 60, an illuminating lens 62, a high contrast, transparent object 64, an imaging lens 66, two beam splitters 68 and 69, an image detector 70 and a pattern analyzer 72. Beam splitter 69 is added into the optical path 8 and serves to provide the image towards the image plane 14, for viewing by a user, and towards image detector 70, which is located at the same distance from the beam-splitter 69 as the image plane 14, for later processing. As is known in the art, if the microscope already includes a CCD camera at the image plane 14, the autofocussing apparatus 40 can utilize the existing CCD and does not need beam splitter 69 and image detector 70.

The light focussing lens 62 illuminates the transparent object 64 with light from source 60. Transparent object 64 can be any high contrast object, such as a metallic pattern on a glass substrate. The pattern can be any easily identifiable pattern, such as a contrast edge, a grid, a circular pattern, etc.

The light from the pattern 64 is gathered and transferred, e.g. as a collimated beam, by imaging lens 66 and the resultant image is projected, via beam splitters 68 and 20 and objective lens 10, onto the object surface 16.

The images of the pattern 64 and of the object on the object surface 16 are transferred through the objective lens 10, the beam splitter 20 and the tube lens 12 and are imaged onto the image detector 70, such as a charge coupled device (CCD), through which they are converted into digital data, to be processed by pattern analyzer 72. It is noted that, in FIG. 3, solid lines indicate light beams while dashed lines indicate the flow of data.

Lens 66 is adjusted to project the pattern 64 onto the object plane, labeled 71, of objective lens 10, from whence the optical system of the microscope images it onto the image plane 14. Thus, if the object surface 16 is at the object plane 71, both images, that of the pattern 64 and of the object on surface 16, will be in focus. Even if the object moves, which causes the object to appear blurry, the pattern 64, which does not move, will remain sharply visible. The object can either move by itself, as might be the case when viewing a living thing, or it can be moved by the microscope, as when the object surface 16 is scanned.

It is noted that, for the microscope of FIG. 3, the object plane is also the focal plane. However, in other types of microscopes, the object plane is other than the focal plane.

When, as shown in FIG. 3, the object surface 16 is not at the object plane 71, the projection of the pattern 64 on the object surface 16 will be out of focus. This is noted in FIG. 3 by the extensions 74 of the light coming from the objective lens 10. The optical system of the microscope passes a defocussed image of the defocussed pattern 64 and the object through to the image plane 14 and to the CCD 70.

It is noted that the image of the pattern 64 is defocussed twice, once as it is projected onto the object surface 16 and once as it is imaged onto the CCD 70. This provides the autofocussing apparatus 40 of the present invention with significant sensitivity to the extent of sharpness of the object. In other words, as the objective lens 10 moves closer to or further from the object surface 16, the image of pattern 64 will get significantly less or more blurry.

Figure 4A:
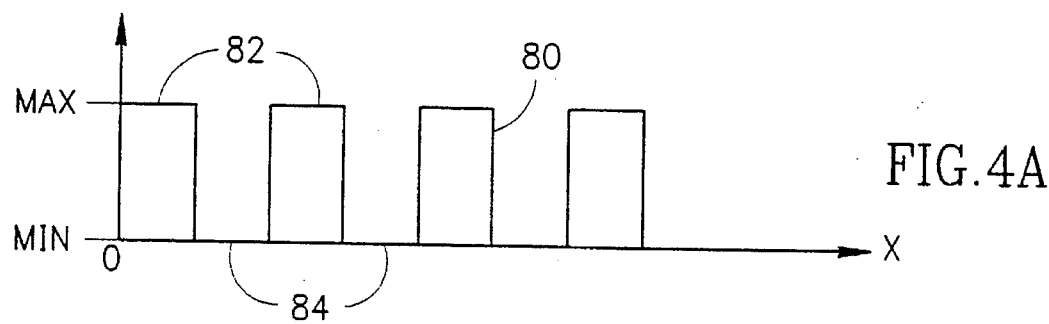
FIGS. 4A, 4B and 4C are graphical illustrations of the grey level signal of an ideal, focussed, and defocussed grid image, respectively.
Figure 4B:
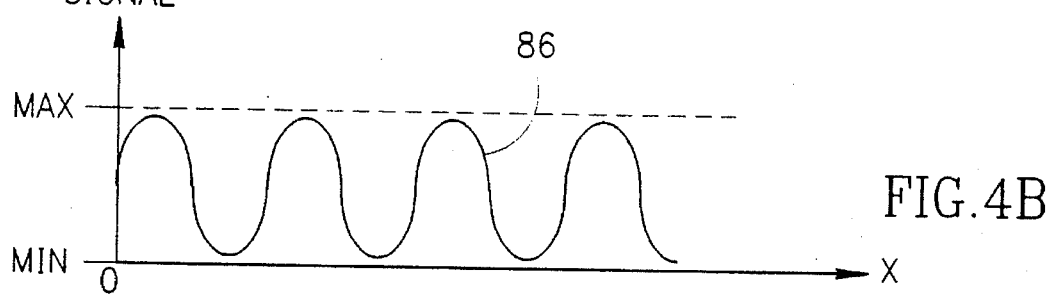
Figure 4C:
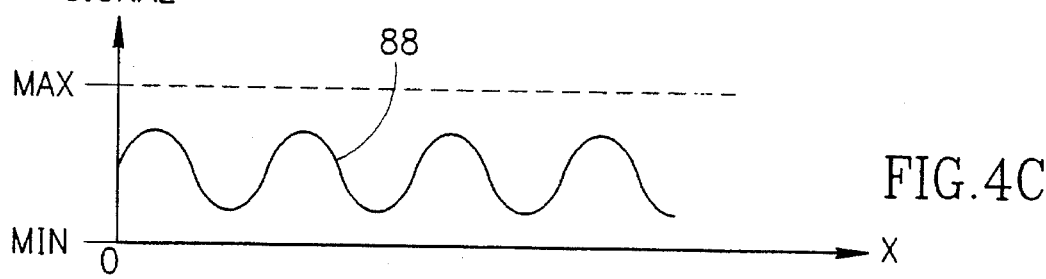

An image of a grid-like pattern is schematically illustrated in FIGS. 4A, 4B and 4C to which reference is now briefly made. Three curves are shown, illustrating light intensity and CCD grey level signal versus horizontal position X. Curve 80 illustrates an ideal pattern intensity profile having portions 82 of complete transmission and portions 84 with no transmission (e.g. opaque). Curve 86 illustrates the grey level signal, received by the CCD, when the object surface 38 is at the object plane 71 of the objective lens 10. Curve 86 is a periodic curve extending the range which is slightly smaller than the range between a minimum intensity MIN and a maximum intensity MAX. Curve 88 illustrates the grey level signal, received by the CCD, when the object surface 16 is away from the object plane 71. Curve 88 is also periodic, but its maximal value is much lower than the MAX signal value and its minimal value is much larger than the MIN signal value.

Returning to FIG. 3, the pattern analyzer 72 receives a frame of data from the CCD 70 and analyzes its sharpness. Analyzer 72 has two analysis methods, depending on whether or not the object surface 16 is scanning during the time for autofocusing.

When the object surface 16 moves, the CCD 70 receives a blurred image of the object. In contrast, the image of the pattern is fixed and does not move with respect to the objective lens 10 and the CCD detector 70. Thus, the image of the pattern will strongly contrast with that of the object and the sharpness of the pattern can be determined.

Figure 4D:
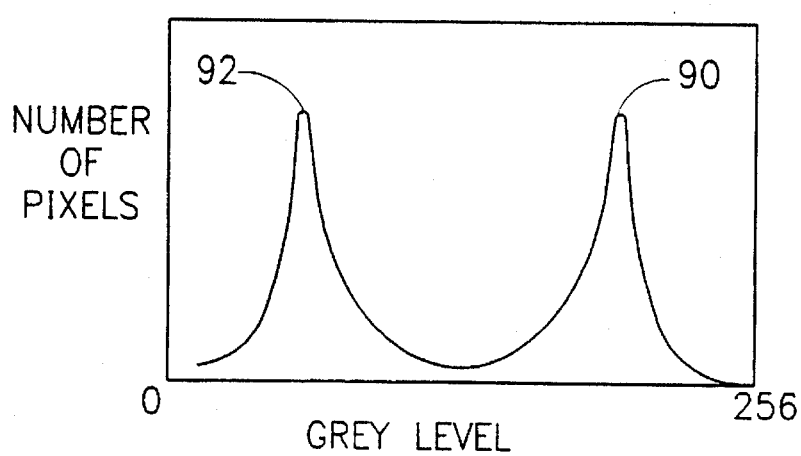
FIGS. 4D and 4E are graphical illustrations of histograms of the curves of FIG. 4B and 4C, respectively.

For example, a grey level histogram, plotting number of pixels at each grey level of the received image, can be generated. When the pattern is in focus, the pixels of the pattern not adjacent to edges will have the same grey level (i.e. transparent areas of the pattern will be at the maximum value of FIG. 4B and opaque areas will be at the minimum value). Thus, a histogram, shown in FIG. 4D to which reference is now briefly made, of a focussed image will have one peak or hill 90 for the transparent portions of the pattern wherein the object is seen and one peak 92 for the opaque (black) portions of the pattern.

Figure 4E:
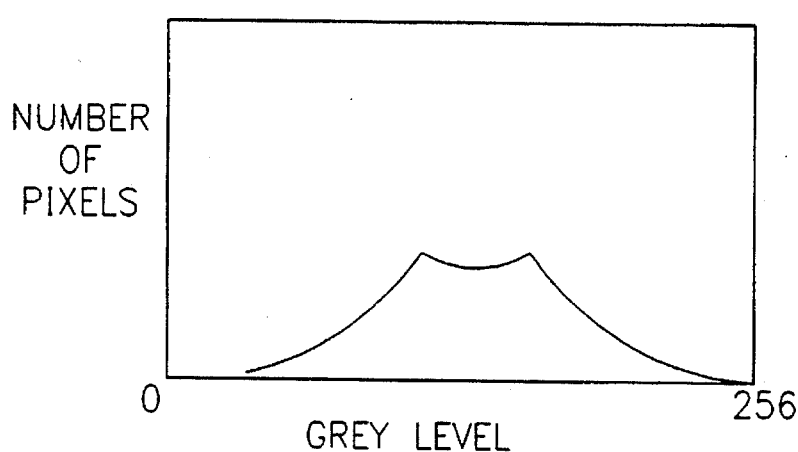

When the pattern is out of focus, the image of the pattern is blurred and thus, a greater number of pixels will have intermediate values between the maximum and minimum values, as indicated by FIG. 4C. Therefore, a histogram, shown in FIG. 4E to which reference is now briefly made, of a defocussed image will be similar to that shown in FIG. 4D but with the two peaks much closer to each other along the grey level axis. When the image is completely blurred, there will be only one peak in the histogram. Therefore, image sharpness can be defined as a function of the distance between the two peaks along the grey level axis.

It will be appreciated that, with the above-described method, autofocussing can occur while the object surface 16 is being scanned, because the image of the object is completely blurred. Accordingly, all points of the grey level histogram are shifted along the grey level axis by approximately the same value and thus, the distance between the peaks, which defines the image sharpness, does not change.

When the object surface 16 is also stationary, the image of the pattern has to be removed from the combined image before the sharpness of the pattern can be determined. The extraction can be performed in any suitable way. For example, since the pattern is usually a periodic pattern, the Fourier transform of the received image will have a peak at the frequency related to the periodicity of the pattern. The received image can be filtered to remove all pixels which are not corresponding to the frequency of the pattern. The sharpness of the resultant image is then determined, in accordance with the histogram method outlined hereinabove.

Alternatively, if there is a CCD at the image plane 14, the CCD can be utilized for pattern analysis. Since the autofocus pattern may interfere with the image being viewed at the image plane, the secondary light source 60 can either be extinguished after autofocussing, or it can have a spectral range different than that which is provided to the CCD at the image plane. For the first situation (extinguishing of the light source), a light emitting diode is appropriate.

For the second situation, the spectral range of the main optical path (to the CCD at the image plane 14) might be in the visible range (400 to 700 nm) and that of the autofocussing path might be in the near infrared range (700 to 900 nm). For this example, the beam splitter 69 should be dichroic; it should transmit light with wavelengths less than 700 nm and reflect light of wavelengths greater than 700 nm.

The difference between the image received by the CCD at the image plane 14 and that received by the CCD 70 provides the image of the pattern. Its sharpness can be determined as described hereinabove.

Since a small change in the distance of the objective lens 10 from the object surface 16 will induce a large change in the sharpness of the image of the pattern (since the pattern 64 is processed twice by the objective lens 10), the pattern analyzer 72 can quickly determine the extent of the sharpness and can control motor 27 accordingly.

Figure 5:
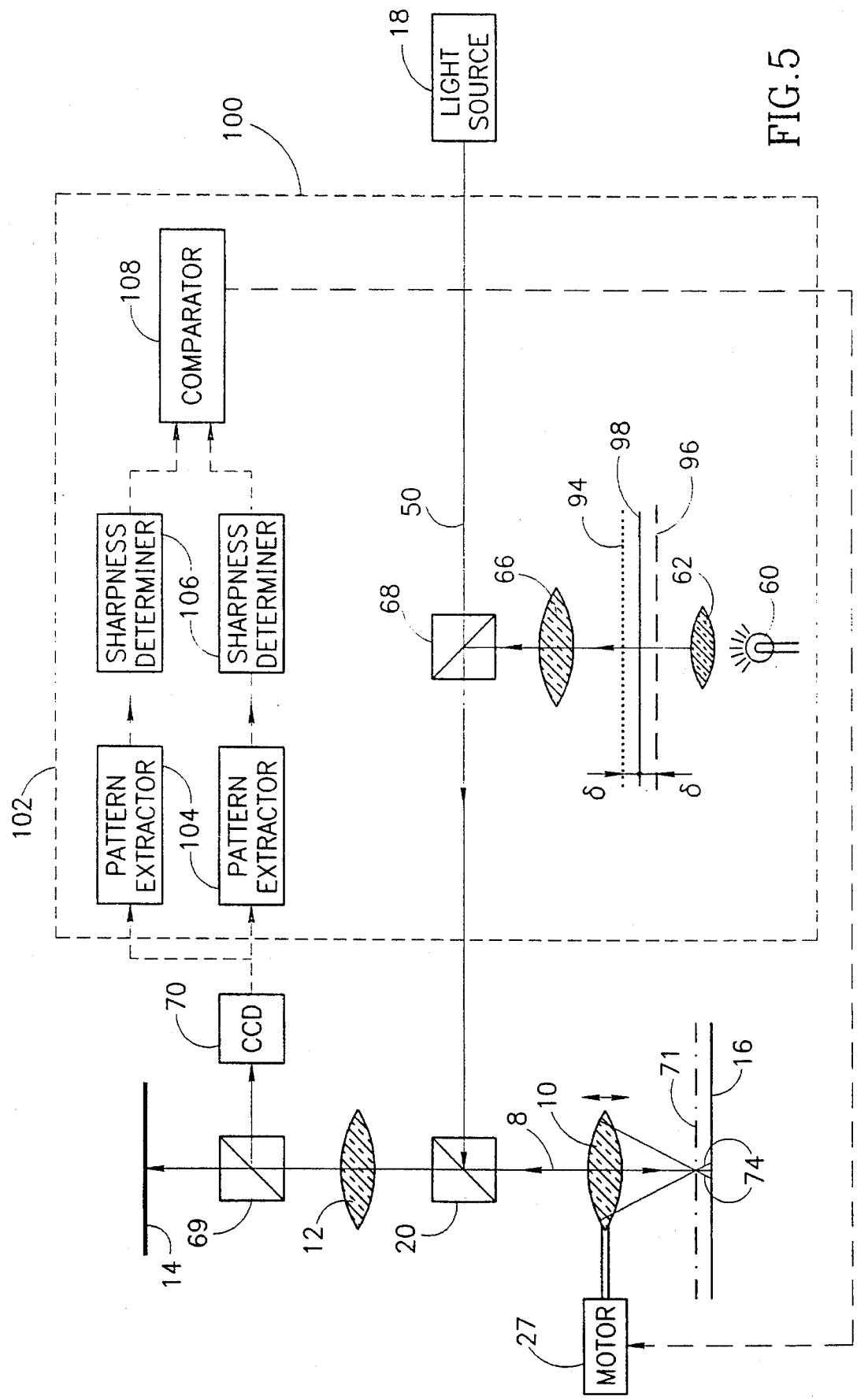
FIG. 5 is a schematic illustration of a microscope with an autofocussing mechanism constructed and operative in accordance with a second preferred embodiment of the present invention.

It will be appreciated that the autofocussing unit of FIG. 3 determines the extent of the sharpness (which indicates the extent of defocus), but not the direction to reduce it. A defocus direction system is provided in the autofocussing apparatus 100 of FIG. 5 to which reference is now made. The autofocussing apparatus 100 of FIG. 5 is similar to that of FIG. 3 except that it has two patterns 94 and 96 and its pattern analyzer, labeled 102, performs a somewhat different analysis method. The remaining elements are similar to those of FIG. 3 and thus, for the purpose of clarity, have similar reference numerals.

Figure 6:
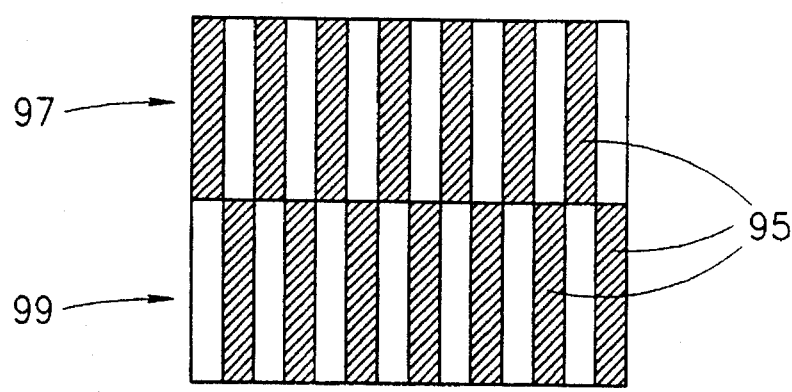
FIG. 6 is a schematic illustration of the image of the patterns of FIG. 5.

In this second embodiment, the two patterns 94 and 96 are designed so as to be separatable. For example, they can have two different patterns or they can be similar patterns but in two different portions of the image plane 14. A resultant image of the latter case is illustrated in FIG. 6. The image has two sets of dark lines 95, one of which is the image 97 of pattern 94 and the other is image 99 of pattern 96. It is noted that the two patterns occupy different portions of the total image; image 97 is above image 99.

Returning to FIG. 5, the two patterns are illustrated as being dotted (pattern 94) and dashed (pattern 96). The two patterns 94 and 96 are respectively placed at a distance δ above and below the object plane 98 of lens 66. As in the previous embodiment, lenses 66 and 10 project object plane 98 onto object plane 71.

Since both patterns 94 and 96 are equidistant from object plane 98, they will be equally out of focus when object surface 16 is at the object plane 71 of objective lens 10. Thus, when both patterns 94 and 96 are equally defocussed (i.e. equally sharp), the object surface 16 is in focus.

The pattern whose image is more in focus indicates the direction which the objective lens 10 (or, alternatively, the object surface 16) has to be moved in order to achieve a focussed image.

Pattern analyzer 102 comprises two pattern extractors 104, each extracting the image of one of the patterns 94 or 96, corresponding sharpness determiners 106 to determine the sharpness of the extracted patterns and a comparator 108 which determines, from the output of sharpness determiners 106, which pattern 94 or 96 is more in focus and by how much. Comparator 108 then commands motor 27 to move the objective lens 70 an amount such that the images of the two patterns 94 and 96 become equally sharp.

It will be appreciated that the autofocussing mechanism of the present invention, in both of its embodiments, works with any numerical aperture of the objective lens, such as lens 10, which is used for imaging the object onto the image plane 14. It is particularly useful when the objects to be viewed are moving, since the stationary autofocus pattern is easy to detect. For stationary objects, more complex pattern analysis, which utilize sophisticated algorithms of extraction of the autofocus pattern from the combined object and autofocus pattern image, must be implemented.

It will further be appreciated that the autofocussing mechanism of the present invention can operate during the autofocussing movement of the objective lens 10 since the image(s) of the pattern(s) is(are) stationary and only its(their) extent of sharpness changes when the objective lens 10 moves.

Figure 7:
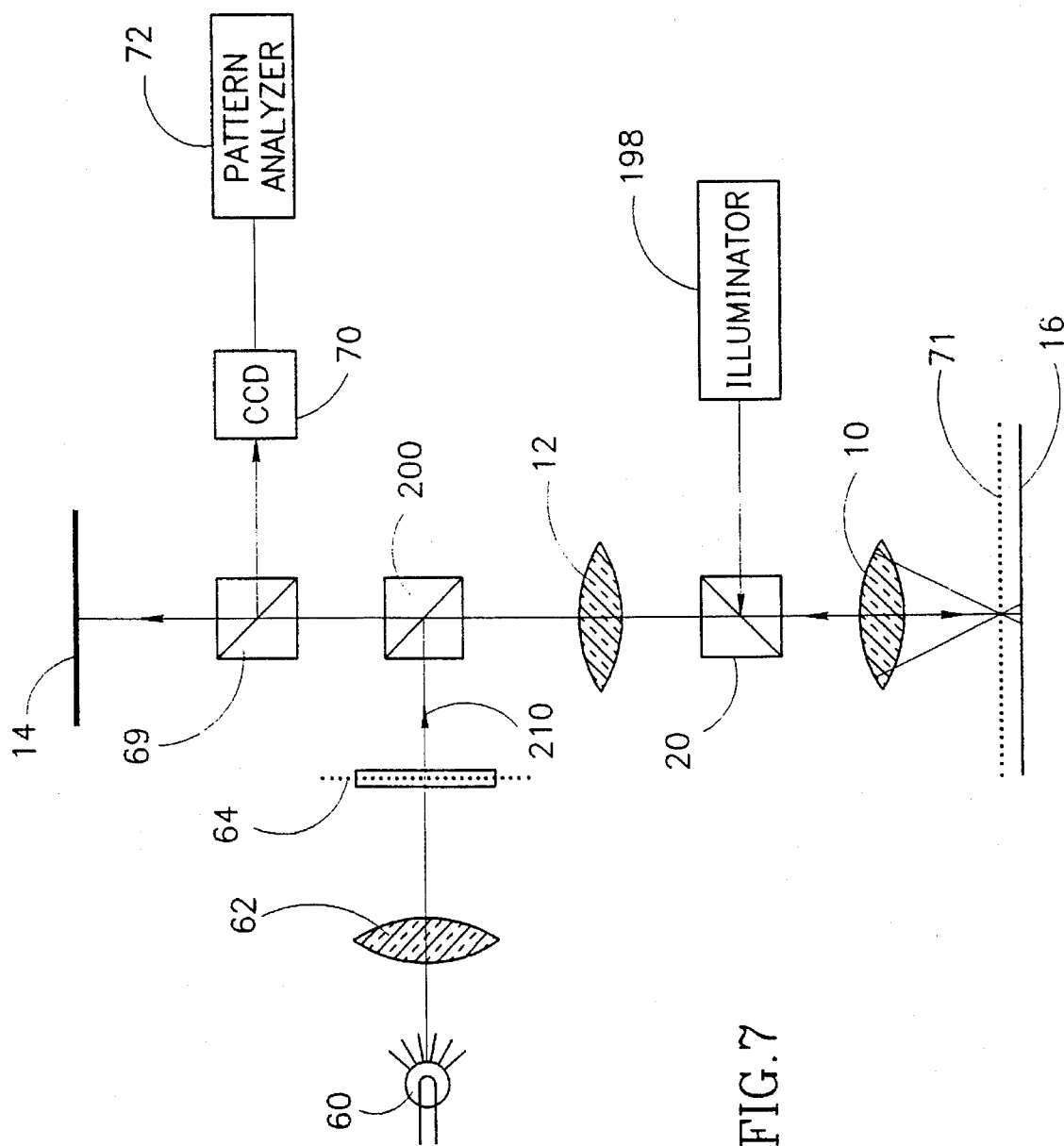
FIG. 7 is a schematic illustration of a microscope with an autofocussing mechanism constructed and operative in accordance with a third preferred embodiment of the present invention.

Reference is now briefly made to FIG. 7 which illustrates the present invention incorporated into an imaging part of a microscope. Similar elements of the microscope and auto-focussing mechanisms have similar reference numerals. The present embodiment may be especially useful when a Kohler illuminator is utilized.

In this embodiment, the light from the illuminator, labeled 198, is not affected. The autofocussing light beam 210 is provided, via a beam splitter 200, into the main optical path. Beam splitter 200 is typically located between the tube lens 12 and the beam splitter 69. The light from the object surface 16, which includes the image of the pattern 64, passes through beam splitter 200 and is split by beam splitter 69 to both the image plane 14 and the CCD 70. As before, pattern analyzer 72 analyzes the image to determine the extent of the sharpness and to indicate how to change the distance between the objective 10 and the object surface 16.

Finally, it will be appreciated by persons skilled in the art that the present invention is not limited to what has been particularly shown and described hereinabove. Rather the scope of the present invention is defined only by the claims which follow:

I claim:

1. An autofocussing microscope comprising:
   a. a microscope optical system having a main optical path, the system comprising:
      i. an objective lens having an object plane;
      ii. an object surface, having an object thereon, to be aligned with said object plane;
      iii. means for changing the distance between said objective lens and said object surface thereby to focus the image of said object; and
      iv. at least one image plane on which said object is imaged;
   b. a pattern imaging system for imaging at least one pattern through said objective lens along said main optical path and onto said object surface, the image of said at least one pattern to be combined with an image of said object and to be reflected along said main optical path towards said image plane;
   c. a single image detector located at one of said at least one image planes for detecting said reflected image; and
   d. a pattern focus analyzer for determining the extent of sharpness of said at least one pattern by analyzing the output of the image detector.

2. An autofocussing microscope according to claim 1 and wherein said pattern imaging system comprises high contrast pattern means, an additional lens for imaging said pattern through said objective lens onto said object plane, an autofocus light source for illuminating said pattern towards said additional lens and a beam splitter for combining said pattern imaging system with said main optical path.

3. An autofocussing microscope according to claim 2 and wherein said high contrast pattern means comprises a single pattern located at the object plane of said additional lens.

4. An autofocussing microscope according to claim 2 and wherein said high contrast pattern means comprises two high contrast patterns located equidistant from the object plane of said additional lens.

5. An autofocussing microscope according to claim 4 and wherein each of said high contrast patterns is imaged on a different part of said object plane of said objective.

6. An autofocussing microscope according to claim 2 wherein said microscope optical system additionally comprises an illuminator and an illumination path and wherein said beam splitter is located along said illumination path.

7. An autofocussing microscope according to claim 2 and wherein said beam splitter is located along said main optical path.

8. An autofocussing microscope according to claim 1 and wherein said autofocus light source provides light which is not visible to the human eye.

9. An autofocussing microscope according to claim 2 and wherein said pattern focus analyzer comprises a pattern extractor for extracting said pattern and a pattern sharpness determiner for determining the sharpness of said pattern.

10. An autofocussing microscope according to claim 9 wherein said high contrast pattern means comprises two high contrast patterns located equidistant from the object plane of said additional lens and wherein said pattern sharpness determiner operates separately on images from each of said two high contrast patterns thereby to generate two sharpness values and wherein said pattern focus analyzer additionally comprises means for determining, from said sharpness values, a direction and amount of movement for said means for changing said distance.

11. An autofocussing mechanism which operates with a microscope having a main optical path, an objective lens, an object surface, an image plane and apparatus for changing the distance between the objective lens and the object surface thereby to focus the image of the object, the autofocussing mechanism comprising:

a. a pattern imaging system for imaging at least one pattern through said objective lens along said main optical path and onto said object surface, the image of said at least one pattern to be combined with an image of said object and to be reflected along said main optical path towards said image plane;

b. a single image detector located at one of said at least one image planes for detecting said reflected image; and c. a pattern focus analyzer for determining the extent of focus of said at least one pattern by analyzing the output of the image detector.

12. An autofocussing mechanism according to claim 11 and wherein said pattern imaging system comprises high contrast pattern means, an additional lens for imaging said pattern through said objective lens onto said object plane, an autofocus light source for illuminating said pattern towards said additional lens and a beam splitter for combining said pattern imaging system with said main optical path.

13. An autofocussing mechanism according to claim 12 and wherein said high contrast pattern means comprises a single pattern located at the object plane of said additional lens.

14. An autofocussing mechanism according to claim 12 and wherein said high contrast pattern means comprises two high contrast patterns located equidistant from the object plane of said additional lens.

15. An autofocussing mechanism according to claim 14 and wherein each of said high contrast patterns is imaged on a different part of said object plane of said objective.

16. An autofocussing mechanism according to claim 11 and wherein said autofocus light source provides light which is not visible to the human eye.

17. An autofocussing mechanism according to claim 12 and wherein said pattern focus analyzer comprises a pattern extractor for extracting said pattern and a pattern sharpness determiner for determining the sharpness of said pattern.

18. An autofocussing mechanism according to claim 17 wherein said high contrast pattern means comprises two high contrast patterns located equidistant from the object plane of said additional lens and wherein said pattern sharpness determiner operates separately on images from each of said two high contrast patterns thereby to generate two sharpness values and wherein said pattern focus analyzer additionally comprises means for determining, from said sharpness values, a direction and amount of movement for said means for changing said distance.

\* \* \* \* \*